July 12, 1932.  W. A. VINSON  1,867,237
MECHANICAL TOY
Filed Dec. 4, 1928   2 Sheets-Sheet 1
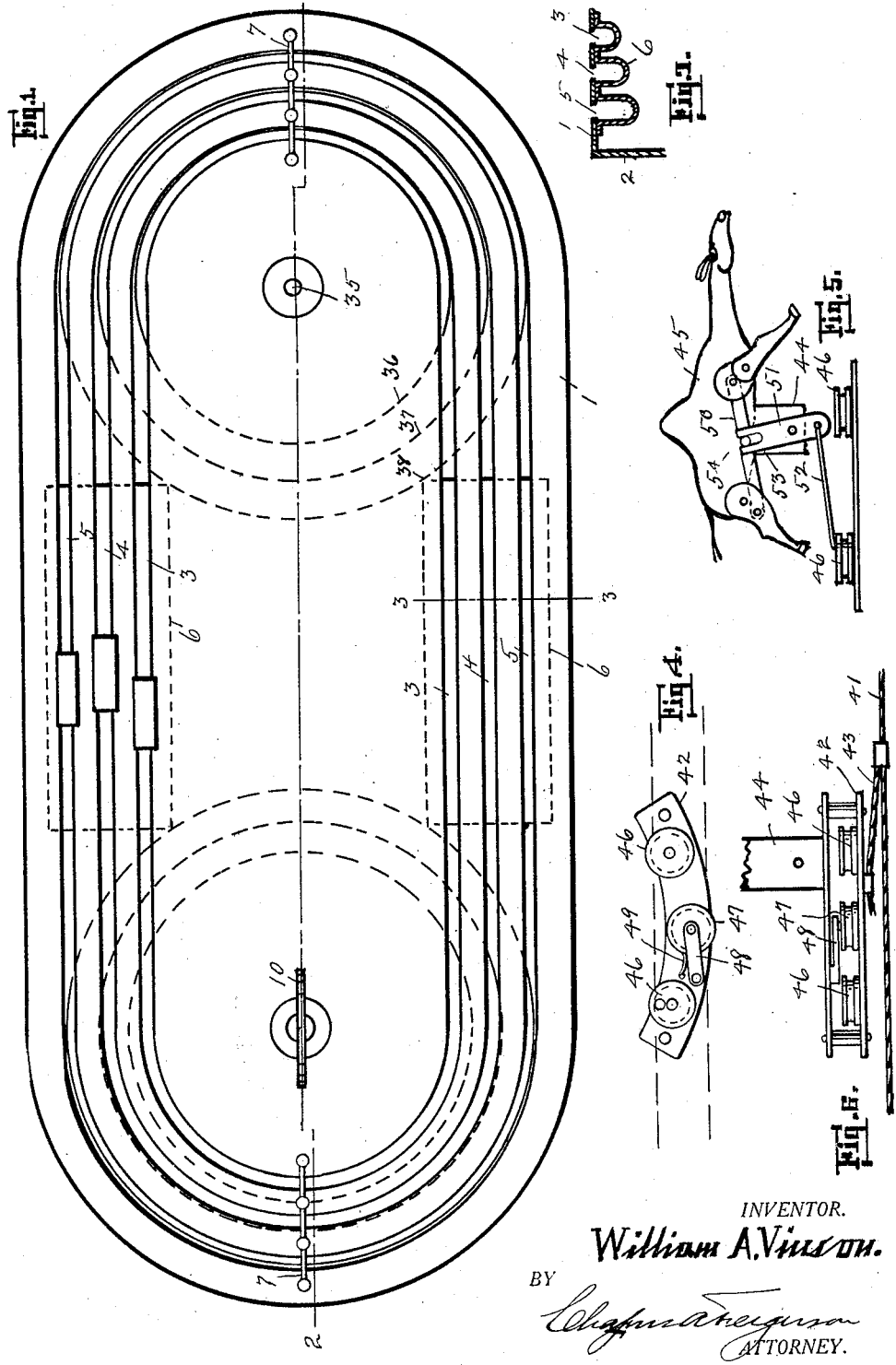
INVENTOR.
William A. Vinson.
BY
Chapman Ferguson
ATTORNEY.

July 12, 1932.  W. A. VINSON  1,867,237
MECHANICAL TOY
Filed Dec. 4, 1928   2 Sheets-Sheet 2
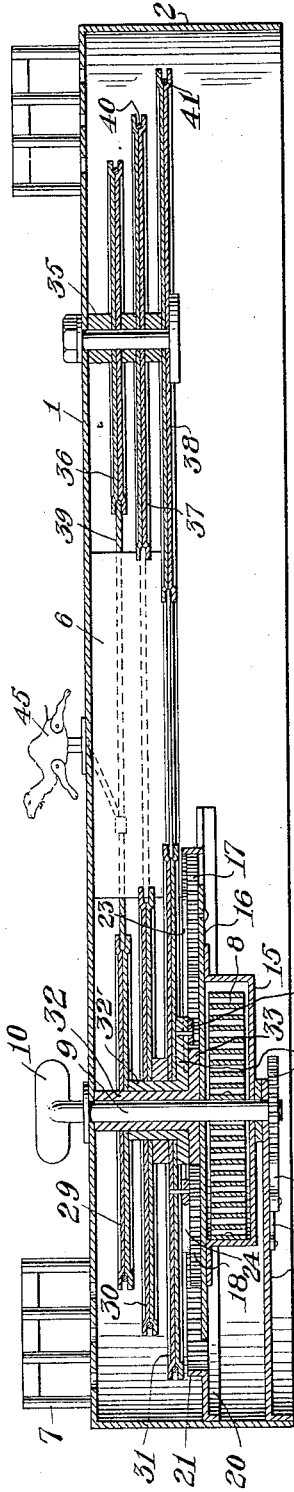
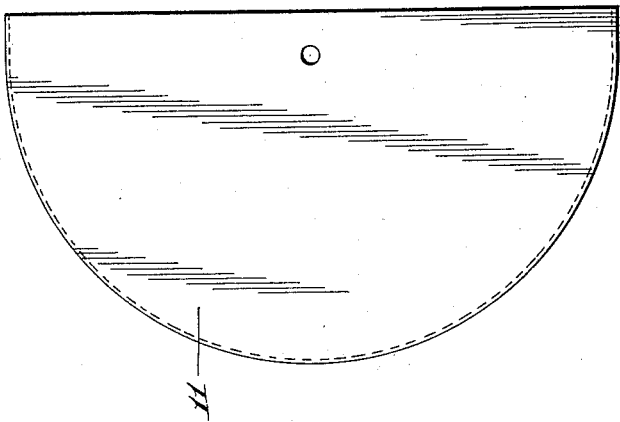
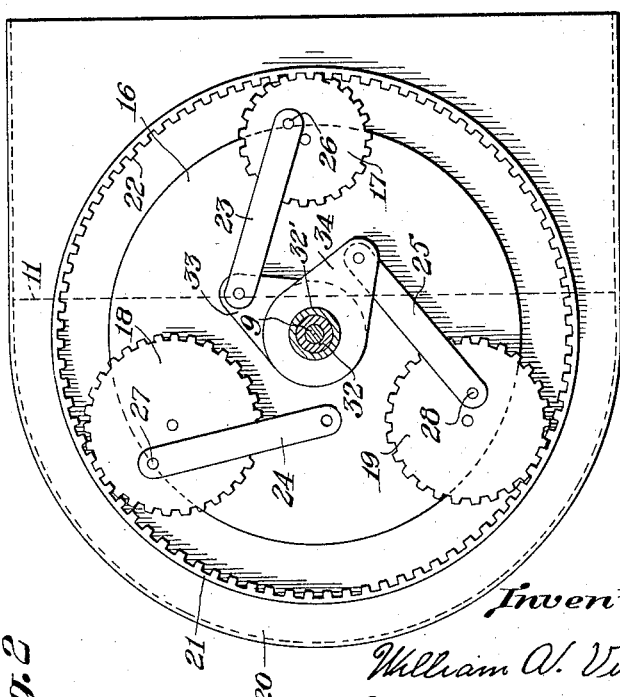
Inventor
William A. Vinson
By Chapman A Ferguson
Atty Patented July 12, 1932

1,867,237

UNITED STATES PATENT OFFICE

WILLIAM A. VINSON, OF BALTIMORE, MARYLAND

MECHANICAL TOY

Application filed December 4, 1928. Serial No. 323,637.

This invention relates to improvements in mechanical toys and has for its object to provide a device having a series of animals moving upon a suitable field and so actuated that they will move at irregular speeds on their course but will remain in proximity to each other. That is, they make the same number of laps around the field but they pass and repass each other at irregular intervals in much the same way as animals travel together in flight.

A further object of this invention is to provide a mechanical toy of this kind in which the legs of the animals move as if they were running.

The invention consists of the novel construction and arrangement of the parts and combination of the parts hereinafter more fully set forth in the following construction and pointed out in detail in the appended claim.

In the accompanying drawings:

Figure 1 is a plan view of the base or field, showing the slots in which the parts for carrying and operating the animals travel.

Figure 2 is a vertical longitudinal section on the line 2—2 of Figure 1.

Figure 3 is a plan view of part of the driving mechanism showing the parts that cause the animals to move at irregular speeds.

Figure 4 is a plan view of one of the carriages which support the animal, the upper bracket being removed therefrom.

Figure 5 is a side elevation of Figure 4 with the animals in position thereon.

Figure 6 is a side elevation of one of the carriages with the animal support broken away and showing the carriage connected with the belt for moving same.

Figure 7 is a detail vertical section of one side of the field or base on the line 3—3 of Figure 1, and Figure 8 is a view of the bearing plate 11.

Referring to the accompanying drawings forming part of this specification and in which like reference numerals designate like parts throughout the several views thereof, 1 designates a field or base having a downwardly projecting flange 2. The said field or base 1 is made of metal, or other suitable material and is provided with a number of endless slots 3, 4 and 5, the metal between the slots 3, 4 and 5 being held in their proper relative position by the retaining members 6 on opposite sides thereof, and the retaining members 7 at opposite ends; the retaining members 6 being located on the under side of the field 1 and the retaining members 7 being on the upper surface and sufficiently high to permit animals to pass thereunder. At one end of the field or base and below the surface thereof is located the driving mechanism which comprises a spring 8 mounted on the shaft 9, which latter extends up through the field or base 1 and is provided with a key 10 for winding the spring 8. The upper end of the shaft 9 is supported in the base 1 and the lower end is supported in the bearing 11, which latter is secured at one end to the flange 2 of the base. The lower end of the shaft 9 is provided with a ratchet 12 which co-operates with the pawl 13 mounted on the lower surface of the bearing 11. The said pawl 13 serves to retain the winding of the spring 8 and is held in contact with the ratchet 12 by the spring 14. The spring case 15 is revolvable around the shaft 9 and is secured to the under surface of the disk 16. One end of the spring 8 is attached to the shaft 9 and the other end to the spring case 15, the unwinding of the spring 8 causes the case 15 to revolve, carrying with it the disk 16 which is secured to the upper surface of said case. Near the outer edge of the disk 16 are mounted 3 planetary sprocket wheels 17, 18 and 19 respectively. These sprocket wheels are so mounted that their outer tangent points sweep the same pitch circle as they are carried around by the disk 16, on which they are mounted. The member 20 is secured to the inner surface of the flange 2 and has a circular, cylindrical portion 21, provided with internal gears 22 which mesh with the planetary sprockets 17, 18 and 19. On each of the sprockets 17, 18 and 19 is mounted a link 23, 24 and 25 which are connected to the pins 26, 27 and 28, respectively and are mounted upon the said sprocket wheels eccentrically to give a reciprocating motion to the links. The pulley wheels 29, 30 and 31 are revolvably mounted on the sleeve 32. The pulley wheel 29 is secured to the sleeve 32, the lower end of which is connected by a lever 33 to the link 23. The pulley wheel 30 is mounted on the sleeve 32′ and is connected at its lower end by means of the crank 34 to the link 25. The pulley wheel 31 is connected on its lower surface to the link 24. The sprocket wheels 17, 18 and 19 are of different pitched diameters or have a different number of teeth which mesh with the internal gear 22 on the member 20, thus causing them to make a different number of revolutions around their planetary course and in making these revolutions they accelerate and decelerate the speed of the pulley wheels 29, 30 and 31, respectively, in their rotation, as the spring 8 carries the mechanism around, the spring drives by the links 23, 24 and 25 in the manner described. At the opposite end of the field or base 1 is located a shaft 35 on which is mounted 3 idler pulley wheels 36, 37 and 38, the said pulleys 36, 37 and 38 being so mounted and have such a diameter that their edges come beneath the endless slots 3, 4 and 5 respectively. Their idler pulleys are connected by cords or belts 39, 40 and 41 to the pulleys 29, 30 and 31 respectively, by means of which latter they are driven. The carriages 42 are connected by a cord or other suitable means 43 to the cords 39, 40 and 41, the said carriage 42 is provided with an upright 44, on which the animal 45 is mounted. These carriages 42 comprise an upper and lower bracket; on the lower bracket are revolvably mounted two grooved wheels 46 which fit one side of one of the slots 3, 4 and 5. A grooved wheel 47 is pivoted to one end of the link 48. The opposite end of the link 48 is pivoted to the upper end of the carriages and is retained against the opposite side of the grooves 3, 4 and 5 by means of the spring 49; this wheel 47 can be pushed back against the action of the spring 49 to permit the grooved wheels to be removed from the groove 45 and also permits the carriage to yield in passing around the curve. The animal 45 is mounted on the upright 44 of the carriage 42. The legs of the animal 45 are connected by a rod 50 pivoted thereto at each end. The link 51 is pivoted to the upright 44 and is connected at its lower end with the rod 52, which latter is connected to one of the wheels 46, the upper end of the link 51 being provided with an elongated slot 53 in which the pin 54 operates. It will thus be seen as the wheels 46 revolve motion will be transmitted through the links 51 and rod 52 to the legs of the animals which will be given then a motion similar to that of running animals.

It will thus be seen that by the mechanism heretofore described that the animals will make the same number of revolutions around the field or base 1 but will pass and repass each other at intervals.

Having thus described my invention what I claim is:

A mechanical toy comprising a base having an annular projecting flange and a series of endless slots in said base, a removable carriage adapted to travel in each of said slots means to permit the carriage to yield when passing around the curve of said slots, an image mounted on each of said carriages and having legs movable independent of the body, means carried by said carriages for operating the legs of said images, and means mounted within said base to cause the carriages and images to travel in an endless course around said base at irregular speeds.

In testimony whereof I affix my signature.

WILLIAM A. VINSON.